US009065305B2

(12) United States Patent
Trinkner

(10) Patent No.: US 9,065,305 B2
(45) Date of Patent: Jun. 23, 2015

(54) ENGINE-GENERATOR WITHOUT FLYWHEEL

(75) Inventor: Mike J. Trinkner, Kaukauna, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 2049 days.

(21) Appl. No.: 11/874,126

(22) Filed: Oct. 17, 2007

(65) Prior Publication Data
US 2009/0101630 A1 Apr. 23, 2009

(51) Int. Cl.
B23K 9/00 (2006.01)
H02K 7/02 (2006.01)
B23K 9/10 (2006.01)
H02K 7/18 (2006.01)
H02K 39/00 (2006.01)

(52) U.S. Cl.
CPC .............. H02K 7/02 (2013.01); B23K 9/1006 (2013.01); B23K 9/1081 (2013.01); H02K 7/1815 (2013.01); H02K 39/00 (2013.01); Y02E 60/16 (2013.01)

(58) Field of Classification Search
USPC ........ 219/131, 133, 134, 135, 25; 322/73, 80, 322/89, 59, 95, 96; 307/9, 10, 26, 29
See application file for complete search history.

(56) References Cited

U.S. PATENT DOCUMENTS

| 2,147,381 | A | | 2/1939 | Heinrich et al. |
| 3,828,754 | A | * | 8/1974 | Carlsson ................ 123/149 D |
| 3,829,652 | A | * | 8/1974 | Terry ........................ 219/133 |
| 4,748,337 | A | * | 5/1988 | Raad et al. ................... 290/31 |
| 4,835,405 | A | * | 5/1989 | Clancey et al. ............. 290/1 A |
| 4,959,595 | A | * | 9/1990 | Nishimura ............... 318/400.41 |
| 5,361,741 | A | * | 11/1994 | Cabral ..................... 123/406.59 |
| 5,365,909 | A | * | 11/1994 | Sawazaki et al. ........... 123/617 |
| 5,784,926 | A | * | 7/1998 | Maass ........................ 74/572.12 |
| 6,121,691 | A | | 9/2000 | Renner |
| 6,172,332 | B1 | | 1/2001 | Trinkner et al. |
| 6,362,533 | B1 | | 3/2002 | Morohoshi et al. |
| 6,472,635 | B2 | | 10/2002 | Trinkner et al. |
| 6,534,958 | B1 | * | 3/2003 | Graber et al. ................. 322/11 |
| 2004/0090134 | A1 | * | 5/2004 | Ide et al. .................... 310/112 |
| 2005/0046191 | A1 | * | 3/2005 | Cole et al. ................. 290/1 A |
| 2005/0126529 | A1 | * | 6/2005 | Higuchi .................... 123/149 D |
| 2007/0108767 | A1 | * | 5/2007 | Hirose et al. ............... 290/1 A |

FOREIGN PATENT DOCUMENTS

WO WO 00/77390 A1 * 12/2000 ............... F02P 1/02
WO WO0077390 12/2000

* cited by examiner

Primary Examiner — Thien S Tran
(74) Attorney, Agent, or Firm — Fletcher Yoder P.C.

(57) ABSTRACT

A system, in one embodiment, may include a welding generator having a rotor and a stator, an engine coupled to the generator wherein the rotor comprises a mass configured to provide a substantial amount of inertia to smooth operation of the engine. A system, in another embodiment, may include an engine and an electromechanical device coupled to the engine, wherein the electromechanical device comprises a rotor having a mass effective to absorb energy from the engine during firing portions and return energy to the engine during non-firing portions of a cycle of the engine. A method is provided for removing a flywheel that substantially provides inertia to an engine of a welding system and providing inertia to smooth operation of the engine without or independent of the flywheel. Another method is provided that includes substantially providing inertia to an engine via a rotor of a generator.

15 Claims, 5 Drawing Sheets

ENGINE-GENERATOR WITHOUT FLYWHEEL

BACKGROUND

The invention relates generally to welding systems and more particularly to welding systems utilizing an engine coupled to a welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites. Such standalone units may also include a battery and an electric starter to start the engine.

The engine used in the welding systems is usually connected to the welding generator via the drive shaft. In addition, the engine generally includes a flywheel to provide rotational inertia to the system. The flywheel also helps achieve a smoother power output by absorbing energy during the firing pulse and dispensing energy during the non-firing portions of the engine cycle. Unfortunately, the flywheel is generally heavy (e.g., a large ferrous disk) as compared to the drive shaft, gears, or other rotating components of the engine. As a result, the flywheel adds considerable weight to the welding system, which is undesirable for a portable engine-driven welding generator. In addition, the flywheel consumes valuable space and increases costs associated with welding systems. Despite all of these drawbacks, the engine performance (e.g., inertia and balancing) relies heavily on the mass of the flywheel.

BRIEF DESCRIPTION

A system, in one embodiment, may include a generator having a rotor and a stator, an engine coupled to the generator wherein the rotor includes a mass configured to provide a substantial amount of inertia to smooth operation of the engine. A system, in another embodiment, may include an engine and an electromechanical device coupled to the engine, wherein the electromechanical device includes a rotor having a mass effective to absorb energy from the engine during firing portions and return energy to the engine during non-firing portions of a cycle of the engine. There is also provided a method that includes removing a flywheel that substantially provides inertia to the engine and providing inertia to the engine without or independent of the flywheel. Additionally, a method is provided that includes substantially providing inertia to an engine via a rotor of a generator coupled to the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
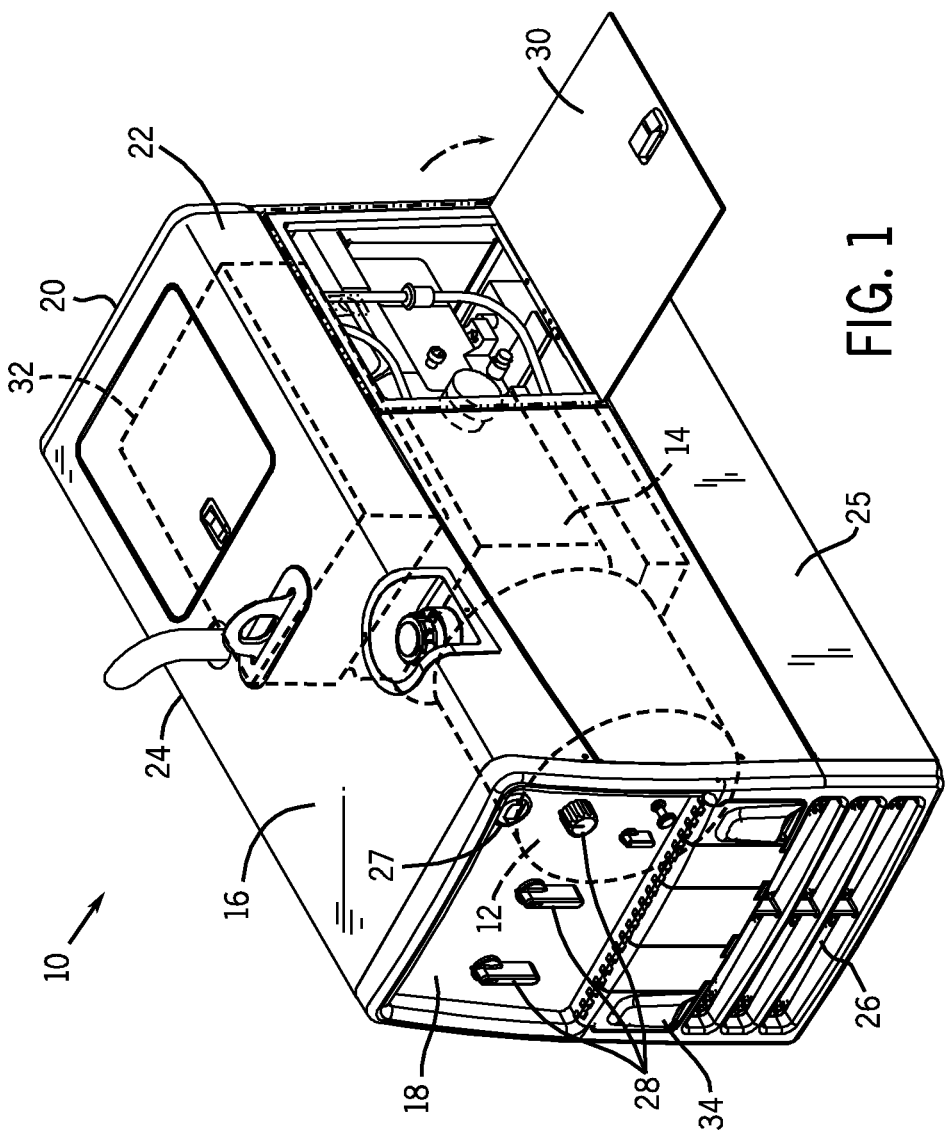
FIG. 1 is a perspective view of an embodiment of an engine-driven welding generator system utilizing the mass of a generator rotor to provide inertia and smooth operation of an engine coupled to a generator.

Referring now to the drawings, FIG. 1 illustrates an engine-driven welding generator system 10 having a generator 12 drivingly coupled to an engine 14 in a single enclosure 16 in accordance with an exemplary embodiment of the present technique. As discussed in detail below, the system 10 may completely exclude or substantially reduce the mass of a flywheel or other standard balancing disc/mechanism to reduce the weight, size, and cost of the system 10, while using other portions of the system 10 to perform the functions of providing inertia, smoothing operation of the engine 14, and starting the engine 14. In other words, the disclosed embodiments employ the mass of a rotary portion of the system 10 not intended or designed to provide inertia and balancing of the engine 14 for precisely that purpose. In this manner, the rotary portion gains a novel function in context of the system 10. The rotary portion may be a rotor of an electromechanical device, such as the generator 12, or another suitable machine having sufficient mass to provide inertia and smooth output of the engine 14. In other embodiment, the rotary portion may not be referred to as a rotor but may be any number of rotating portions of an electromechanical device. The disclosed embodiments may be used in a variety of electromechanical systems, including welding systems, non-welding systems, motor-generator systems, and so forth.

As discussed in detail below, the single enclosure 16 includes multiple functionalities in one portable system to improve productivity and reduce space consumption. Specifically, the system 10 is configured to output electrical power for a variety of applications, including welding, cutting, battery charging, jump starting, and so forth. Moreover, the system 10 includes intelligence (e.g., logic in software and/or hardware) to adjust the outputs based on various feedback of the system 10 and the external device receiving the electrical power from the system 10. For example, the system 10 does not blindly provide an output power for welding and/or charging, but rather the system 10 analyzes various parameters, executes various logic, and intakes sensed feedback to make an intelligent decision regarding the output. In some embodiments, however, the system 10 may provide output power without adjustment or analysis of any parameters or feedback. The enclosure consist of a front panel 18, a rear panel 20, a right side 22, and a left side 24, all engaging a base 25 to complete the enclosure. The enclosure protects the engine and generator form dust, debris, and rough handling. The enclosure also reduces noise and helps to cool the engine by preventing hot air recirculation via the cool air inlet 26 on the front panel 18 by pulling air through the interior volume of the enclosure. The rear panel 20 may also include an air inlet for intake or exhaust flow of air.

A control system regulates the electrical power supplied by the generator and allows for it to be used for welding process and/or auxiliary power to other devices or tools. The control panel 18 may include various control inputs, indicators, displays, electrical outputs, and so forth. In one embodiment, the control panel 18 may include various indicators 27 to provide feedback to the user. For example, the indicator 27 may include an LCD to display voltage, amperage, air pressure, and the like. Further, in some embodiments a user input 28 may include a knob or button configured for a mode of operation, an output level or type, etc. For instance, the user input 28 may include a dial rotatable to select a mode of operation, such as a DC weld, an AC weld, a battery charge, or a tool operation. Embodiments of the control panel 18 include any number of inputs and outputs, such as welding methods, oil pressure, oil temperature, and system power.

The engine 14 provides output power (e.g., a mechanical output) to drive the welding generator 12. In the illustrated embodiment, the generator 12 is coupled to rear of the engine 14, while the front of the engine 14 may include a substantially reduced flywheel or no flywheel at all. For example, if a flywheel is included in the system 10, then the flywheel may be nonferrous (e.g., aluminum, plastic, fiberglass, ceramic, etc.) and of insufficient mass to smooth operation of the engine 14. Instead, as discussed in detail below, the operation of the engine 14 may be smoothed via the mass of the generator 12 rotor coupled to the engine 14 rather than the flywheel or other standard inertia-providing device. As described below, the power from the engine 14 operates the generator 12 via a drive shaft. The drive shaft may be directly or indirectly coupled to one or more driven mechanisms. For example, an indirect coupling may include a belt and pulley system, a gear system, or a chain and sprocket system. In the present embodiment, the drive shaft couples directly to the generator 12. However, either arrangement can be used for the connection between the engine 14 and the generator 12.

In an embodiment, the engine 14 may include a combustion engine powered by gas or diesel, LP fuel, natural gas, or other fuel and driving one or more drive shafts. For example, the engine 14 may include an industrial gas/diesel engine configured to output anywhere from about 9 horsepower (Hp) to about 23 Hp. Generally, the weight of such an engine 14 may vary with the size and Hp rating of the engine. For example, a 23 Hp engine may weigh approximately 100 lbs., whereas a similar 9 Hp engine may weigh less than approximately 50 lbs. Thus, the portable system 10 may benefit from the use of a smaller engine 14. Further improvements in weight and size may be realized through the use of the lightweight flywheel or flywheel-less system discussed further herein.

As discussed previously, embodiments may include a generator 12 coupled to the engine 14. Thus, the generator 12 may convert the power output (e.g., mechanical energy) of the engine 14 to an electrical power. Generally, the generator 12 includes a device configured to convert a rotating magnetic field into an electrical current (e.g., AC generator). The generator 12 includes a rotor (rotating portion of the generator) and a stator (the stationary portion of the generator). For example, the rotor of the generator 12 may include the rotating drive shaft of the engine 14 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 12 may include a plurality of independent winding sections in the rotors and/or stators, such that the generator 12 is configured to output multiple electrical outputs having different characteristics. For example, the generator 12 may include a first section configured to drive a welding current to a welder and a second section configured to drive a current for other AC outputs. In some embodiments, multiple generators 12 may be connected to the drive shaft.

As depicted in FIG. 1, the enclosure 16 includes various access panels to enable servicing, repair, and so forth. For example, a side access panel 30 is configured to attach to opposite sides of the enclosure. The top of the enclosure 16 includes an access panel or hatch 32, which are both rotatable between open and closed positions above the components of the system 10. The top hatch 32 can rotate open to enable access to the engine 14. Similarly, the side access panel 30 can rotate open to enable access to the engine 14, oil filter, spark plugs, etc.

The illustrated system 10 also includes various external connections 34. The external connections 34 may include various outlets and couplers configured to provide access to the electrical power generated by the system 10. For example, the external connections 34 may include an AC power output and a DC power output, which may be coupled to various devices and tools. For example, the AC power output may provide auxiliary power to various devices or tools integrated within or coupled to the system 10. The DC power output can be coupled to various welding and cutting tools, such as a welding torch. The welding devices may receive current from the generator 12 via the external connections 34. As will be appreciated, the torch may include various welding devices, such as a TIG (tungsten inert gas) torch, a MIG (metal inert gas) gun, or a plasma cutting torch. The system 10 may also include welding cable connecting the torch to the external connections 34. Further, the system 10 may include other components necessary for operation of a welding device, such as a wire feeder, a shielding gas supply, and/or any other component or combination thereof.

Figure 2:
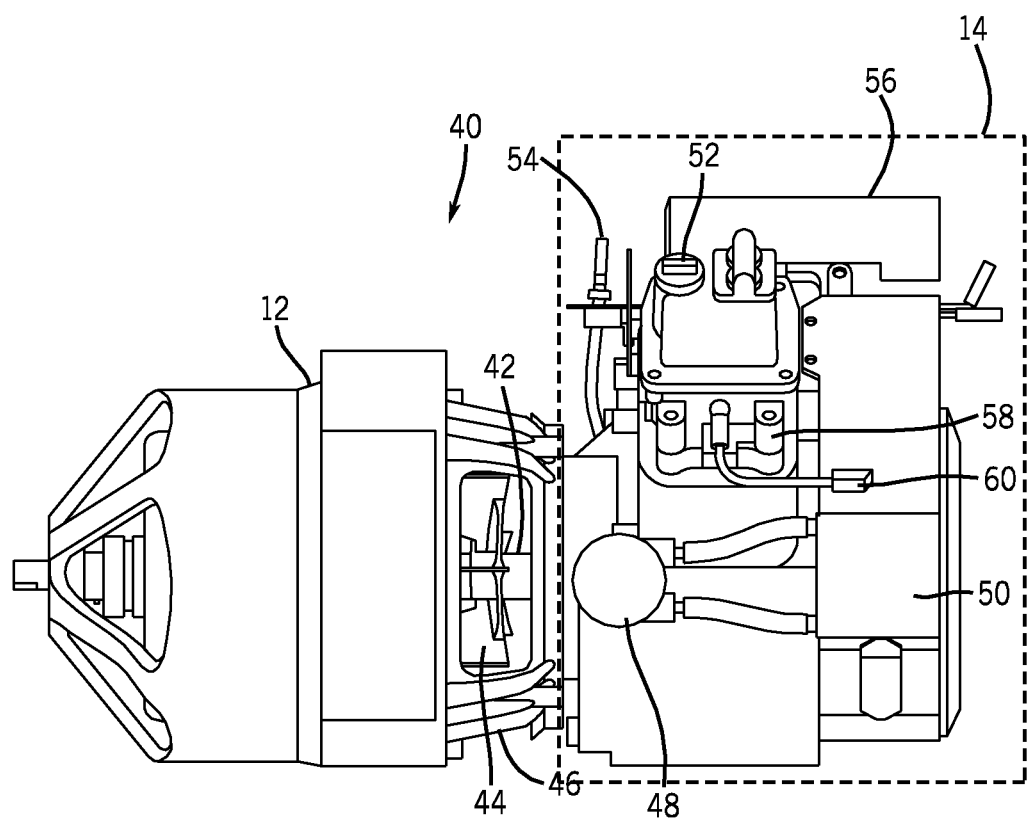
FIG. 2 is a side view of an embodiment of the generator and the engine of the system of FIG. 1.

FIG. 2 is a side view of the generator and engine assembly 40 of the welding system of FIG. 1. As can be more clearly seen in FIG. 2, the engine 14 is coupled to the rotor of the generator 12 via a drive shaft 42. Various components on the generator 12 and engine 14 are shown and described in further detail below. Again, as noted above, the assembly 40 may entirely exclude a flywheel, disk, or other standard energy-absorbing mechanism. Instead, the assembly 40 may rely on the mass of the generator 12 rotor to provide a substantial amount of inertia to smooth operation of the engine 14, e.g., smooth power output of the engine 14. For example, the generator 12 rotor may have a mass effective to absorb energy from the engine 14 during firing portions and return energy to the engine 14 during non-firing portions of a cycle of the engine 14. In some embodiments, the engine 14 may be coupled to a flywheel having a reduced size, mass, etc., such that it is insufficient to smooth operation of the engine 14, but it is still useful for other functions.

The generator 12 may include a fan 44 coupled to the rotor, such that the fan 44 rotates with the rotor and provides air flow and cooling to the generator 12 and/or engine 14. In addition, the fan 44 may be surrounded by a cage 46 or other enclosure for safety reasons. As discussed above, the generator 12 includes a rotor and a stator to produce electricity as the rotor is turned by the drive shaft 42 of the engine.

The engine 14, coupled to the generator 12 via the drive shaft 42, may include any number of components suitable for engine control, maintenance, and servicing. For example, the engine may include an oil filter 48, oil cooler 50, oil fill 52, and a dipstick 54, for use in maintaining and servicing the oil used in the engine. Additionally, the engine 14 may include an air cleaner/filter assembly 56. The engine may include one or more spark plugs 58 connected to a firing mechanism in order to provide for correct timing of the firing pulse. In one embodiment, the spark plugs may be fired by a magento that includes magnets on a flywheel and an ignition coil 60. For example, a non-standard flywheel (e.g., insufficient mass to provide inertia and balancing of the engine 14) may include such magnets, a fan, a gear for engagement with a starter, or a combination thereof. Such a flywheel may be made of a nonferrous material, such as aluminum, plastic, ceramic, fiberglass, or a combination thereof. In other embodiments, as described further below, the spark plug timing and firing may be controlled by a Hall effect sensor and electronic ignition system, e.g., without any features mounted on a flywheel. Further, the engine 14 may include an electronic fuel injection (EFI) system or a carburetor to provide fuel for combustion. Additionally, the engine 14 may include an electronic control having a processor, memory, etc. Finally, the engine 14 may include various sensors, such as oxygen sensor, air flow sensor, engine speed sensors, etc.

The engine may also include an electric starter and an electric charging mechanism. In a one embodiment of the engine-generator assembly 40, the electric starter engages a ring gear on a flywheel to start the engine. The electric starter may be powered by a battery elsewhere in the system and may be activated by a key, switch, or other user input 28 on the control panel 18. The battery may be charged by the electric charging mechanism of the engine 14. In one embodiment, the charging mechanism includes charging magnets on a flywheel, a stator, and a regulator-rectifier to convert to DC power. Alternatively, as described below, in some embodiments the battery may be charged by the generator 12.

Figure 3:
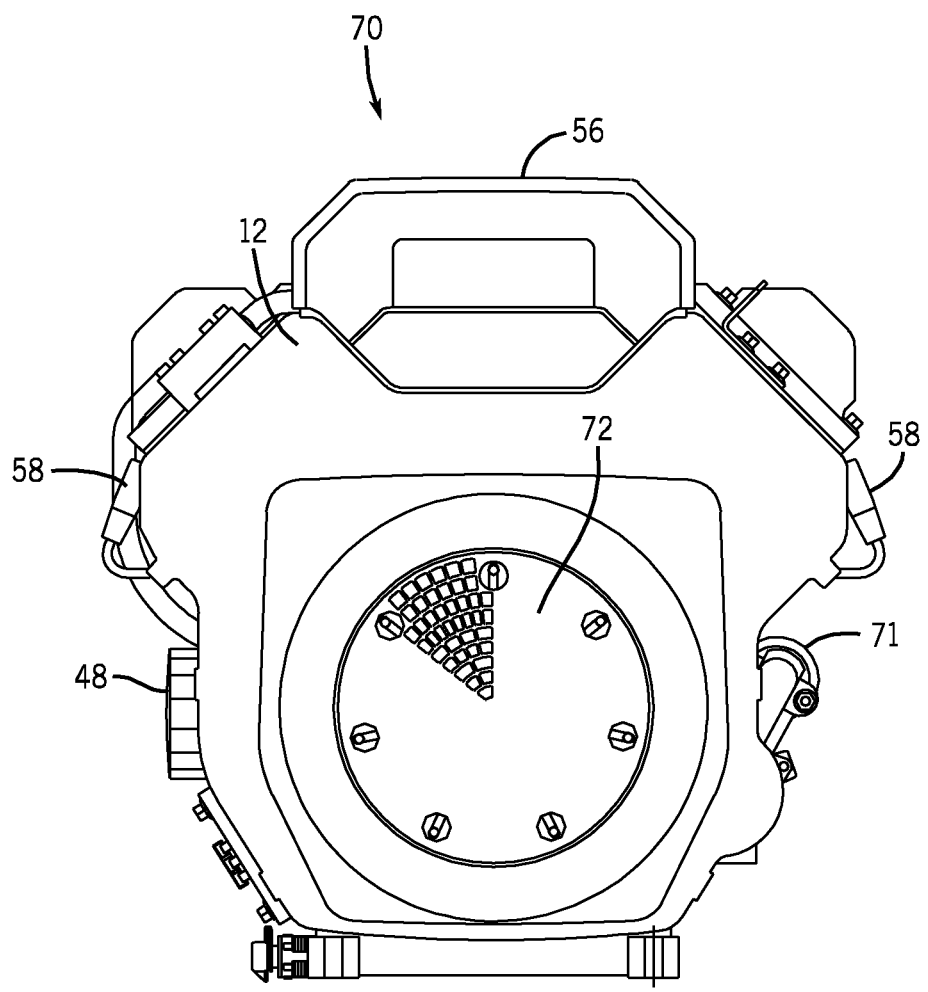
FIG. 3 is a rear view of an embodiment of the engine of FIG. 2 and a flywheel mounting location.

FIG. 3 depicts a front view 70 of the engine 14 in accordance with an embodiment of the present technique. The electric starter 71 is located on the side of the engine 14. The rear of the engine 14 provides a mounting point 72 for a flywheel. In conventional engine-generator assemblies for portable welding systems, a "heavy flywheel" is attached to the engine 14. As used herein, the term "heavy flywheel" refers to a flywheel that substantially provides the inertia for the engine 14. As will be described further below, the present invention provides for use of a "lightweight" flywheel or removal of the flywheel completely, while relocating those critical functions provided by a conventional heavy flywheel.

The primary function of a conventional heavy flywheel is to provide inertia for operation of the engine 14 and ensure a smoother power output by absorbing and releasing energy during the firing and non-firing portions of the engine cycle. Advantageously, the disclosed embodiments reduce the cost and weight associated with the use of a conventional heavy flywheel by using the rotor of the generator 12 to provide the desired inertia for the engine 14. Further, removal of a conventional heavy flywheel may reduce the overall length of the engine 14, and therefore of the entire engine-generator assembly, and provide space or packaging advantages over engines with heavy flywheels. Two embodiments illustrating the generator-engine assembly are described below. In one embodiment, the flywheel is completely removed and inertia is substantially provided by the rotor of the generator. In another embodiment, a lightweight flywheel is used in place of the heavy flywheel, with inertia for the engine 14 still substantially provided by the rotor of the generator 12.

This lightweight flywheel is intended to provide certain functionalities without the primary function of inertia, balancing, and so forth. For example, the flywheel may include magnets for firing the spark plugs, and may include charging magnets for charging a battery coupled to the engine 14. The flywheel may also provide a secure mounting location for a ring gear for use in starting the engine 14. An electric starter 71 may engage the ring gear on the flywheel, turning the flywheel and therefore rotating the engine drive shaft and providing momentum to start the engine 14. Finally, in some embodiments, a fan may be coupled to the surface of the flywheel. As the flywheel turns, the fan turns as well, providing air flow and cooling to the engine 14. Such air flow and cooling may be of greater importance when the engine 14 is installed in an enclosed area, such as the enclosure 16 of the welding system of FIG. 1.

Figure 4:
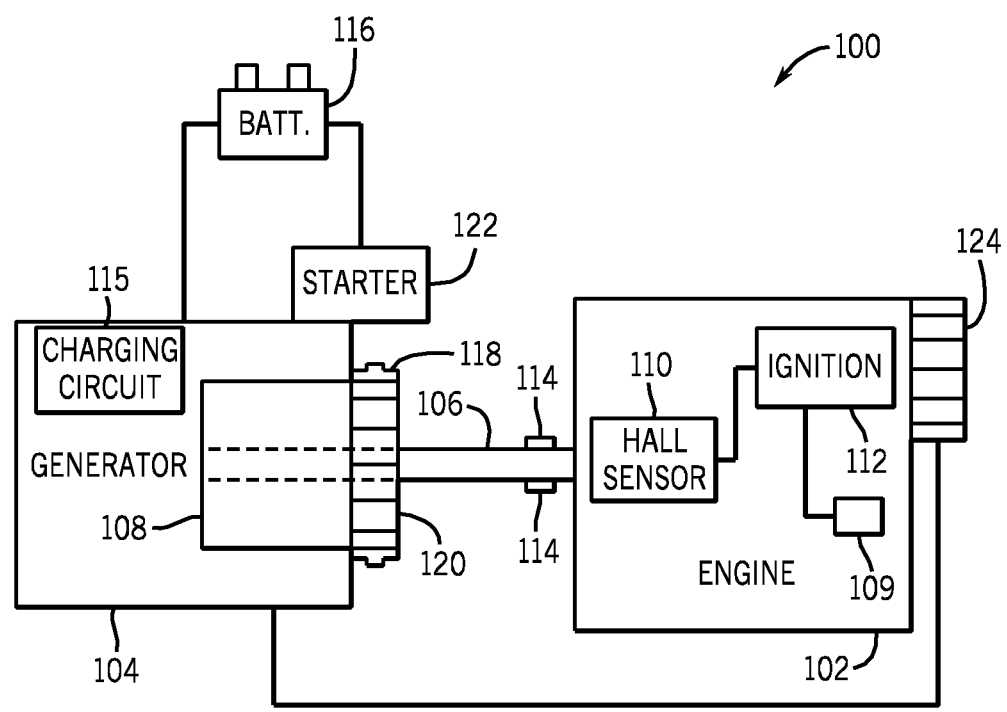
FIG. 4 is a block diagram of a generator and engine assembly of an exemplary welding system without a flywheel in accordance with embodiments of the present invention.

FIG. 4 is a block diagram depicting an embodiment of a generator-engine assembly 100 of a portable welding system with the flywheel completely removed (e.g., flywheel-free). The diagram depicts an engine 102 drivingly coupled to a generator 104 via a drive shaft 106. Inertia for the engine 102 is at least substantially or entirely provided by the mass of the rotor 108 of the generator 104, and the conventional heavy flywheel is eliminated to reduce weight, space consumption, and costs. The depicted embodiment relocates or replaces the functions provided by a conventional heavy flywheel.

The primary functions of the removed heavy flywheel, e.g., engine inertia, are provided by the rotor 108 of the generator 104. As discussed above, the rotor 108 is connected to the drive shaft 106 of the engine 102. Thus, the engine 102 initially overcomes the inertia of the rotor 108 of the generator 104 in order to turn the drive shaft 106. In one embodiment, the engine 102 must be continuously connected to the rotor 108 of the generator 104 during start-up. In other embodiments, the generator 104 may be initially disconnected from the engine 102 to reduce the load on the engine 102, thereby substantially improving the ease of starting the engine 102. Thus, by removing the flywheel in the illustrated assembly 100 of FIG. 4, the engine 102 can startup more easily without the mass of the flywheel. Similarly, by disconnected the rotor 108 from the engine 102 during startup, the engine 102 can startup more easily and then subsequently connect with the rotor 108 to operate the generator 104 and obtain inertia to smooth operation the engine 102. In certain embodiments, the assembly 100 may include a clutch, such as a centrifugal clutch, wet clutch, belt and pulley system, or a combination thereof, to gradually engage the rotor 108 with the engine 102.

In the embodiment depicted in FIG. 4, the spark plugs 109 of the engine 102 may be fired by a Hall effect sensor 110 and electronic ignition system 112. The Hall effect sensor 110 relies on the Hall effect. The Hall effect describes an effect that occurs when between an electric current flowing through a conductor and magnetic field exerted perpendicular to the conductor. A potential is created between both sides of the conductor, thus providing a measurable voltage. In this embodiment, firing magnets or magnet assembly 114 are attached to the drive shaft 106. Alternatively, the firing magnets may be attached to a stub shaft extending from the end of the engine 102 opposite the generator 104. The Hall effect sensor 110 includes a ground connection, a reference voltage connection, and an output signal connection. As the drive shaft 106 rotates, the changes in magnetic field density as each magnet or magnet assembly 114 passes the Hall effect sensor 110 causes the output voltage signal of the Hall effect sensor 110 to change. This voltage signal is received by the electronic ignition 112 and used to fire the spark plugs 109 according to the rotation of the drive shaft 106. The electronic ignition 112 may include a processor, memory, and any other components suitable to process the voltage signal received from the Hall effect sensor 110. Both the Hall effect sensor 110 and the electronic ignition 112 may be coupled to the engine and securely enclosed to prevent exposure to engine fluids or other damaging substances.

The engine-generator assembly 100 may also include a battery charging function provided by the charging circuit 115 and the generator 104. The charging circuit 115 may include a rectifier to convert AC output from the generator 108 to DC output to charge the batter 116. The exemplary portable welding system discussed above includes a battery that may be used to actuate the electronic starter. The battery 116 may be charged by the generator 104 during operation of the engine-generator assembly 100. In other embodiments, other charging mechanisms, such as an alternator, may be added to the generator 104.

To replace the starting function for the engine 102, a ring gear 118 may be providing on the cooling fan 120 of the generator. As discussed above, the cooling fan 120 of the generator 104 is coupled to the rotor 108 of the generator 104 and rotates with the rotor 108. An electric starter 122 may be located to the side of the generator 104 so as to engage the ring gear 118 of the cooling fan 120 when the starter 122 is activated. To start the engine-generator assembly 100, an operator may activate a user input on a control panel, such as by turning a key or activating a switch. The electric starter 122 receives current from the battery and engages the ring gear 118 on the generator cooling fan 120, turning the generator cooling fan 120, the rotor 108, and the drive shaft 106, thus starting the engine 102.

Alternatively, in some embodiments the ring gear 118 of the starting mechanism may be located elsewhere in the engine generator assembly 100. For example, in one embodiment, the ring gear 118 may be located on the rotor shaft, while in other embodiments the ring gear 118 may be located on the rotor 108 itself. In either embodiment, the electric starter 122 may be relocated and/or embedded in the generator 104 such that it can engage the ring gear 118 on the rotor shaft or the rotor 108.

An electric cooling fan 124 may be attached to the engine at the side or top of the engine. The electric cooling fan 124 may replace a mechanical fan attached to the removed flywheel as described above. The electric cooling fan 124 may be driven by the battery, generator, or other AC or DC output device in the welding system.

Figure 5:
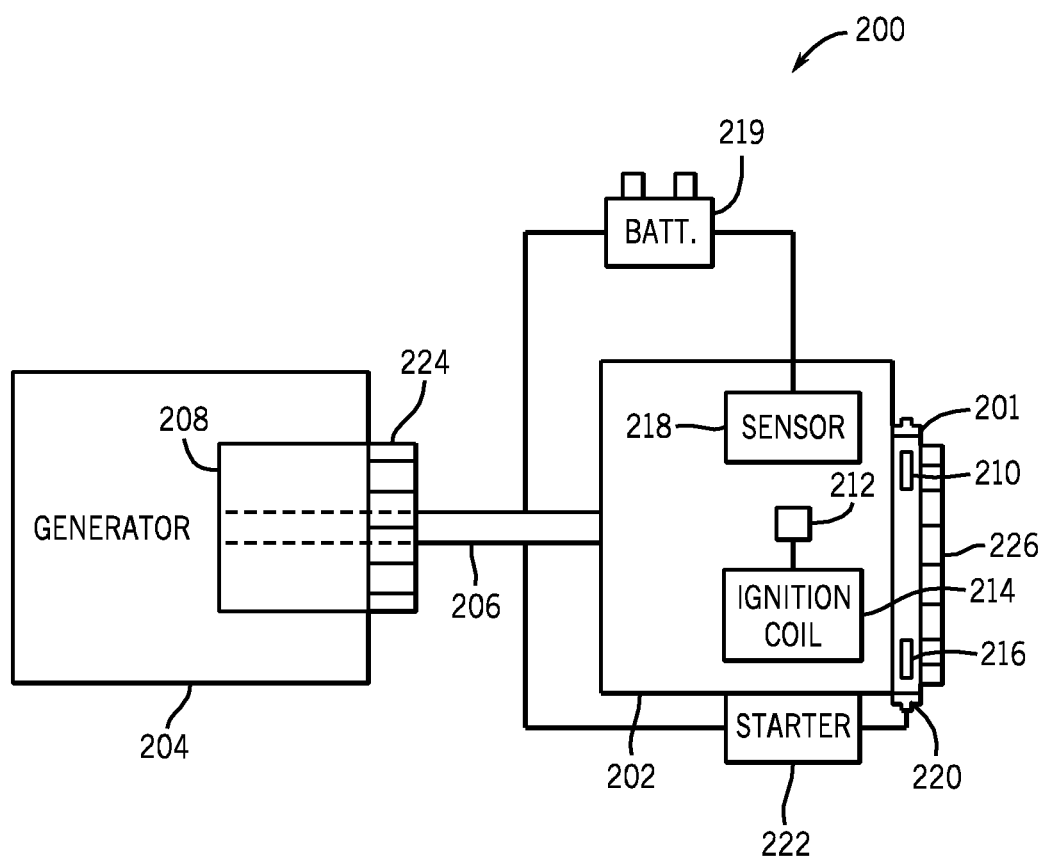
FIG. 5 is a block diagram of a generator and engine assembly of an exemplary welding system with a lightweight flywheel in accordance with embodiments of the present invention.

FIG. 5 is a block diagram depicting an embodiment of a generator-engine assembly 200 of a portable welding system with a lightweight flywheel 201 in accordance with an embodiment of the present invention. The diagram depicts an engine 202 drivingly coupled to a generator 204 via a drive shaft 206. Inertia for the engine 202 is substantially provided by the mass of the rotor 208 of the generator 204, and the conventional heavy flywheel is eliminated.

As stated above, removal of the heavy flywheel advantageously reduces the weight and cost of the engine 202 and engine-generator assembly 200, while allowing reductions in size and packaging of the assembly and the portable welding system. Further, the disclosed embodiments provide for relocating or reconfiguring the functions provided by a conventional heavy flywheel such that removal of the heavy flywheel does not impair or inhibit operation of the engine-generator assembly 200.

The primary functions of a conventional heavy flywheel, e.g., inertia and balancing for the engine 202, are provided by the rotor 208 of the generator 204. As discussed above, the rotor 208 is connected to the drive shaft 206 of the engine 202. Thus, the engine 202 initially overcomes the inertia of the rotor 208 of the generator 204 to turn the drive shaft 206. The lightweight flywheel 201 included in the embodiment may be manufactured from a nonferrous material, such as aluminum, plastic, ceramic, fiberglass, or a combination thereof, or another lightweight material that does not have sufficient mass to provide inertia for the system. However, as discussed above, the lightweight flywheel 201 may overcome the disadvantages associated with a conventional heavy flywheel by providing reductions in weight and cost and additional size and packaging advantages. For example, the lightweight flywheel 201 may be less than 70, 60, 50, 40, 30, 20, or 10 percent of the size and/or weight of the conventional heavy flywheel used with the assembly 200.

The lightweight flywheel 201 may provide many desirable functions, despite the lack of sufficient mass to generally provide inertia to the engine 202. For example, the lightweight flywheel 201 may include magnets 210 to fire spark plugs 212, using a magneto to activate an ignition coil 214 as described above. Additionally, the lightweight flywheel 210 may also include charging magnets 216 that rotate in front of a stator 218 to produce a charging current, as described above. A battery 219 is charged by the charging current generated by the magnet or magnet assembly 216 and stator 218. To provide the starting function for the engine 202, a ring gear 220 may be attached to the lightweight flywheel 210 to engage an electric starter 222 and rotate the flywheel 210, drive shaft 206, and generator rotor 208 when starting the engine 202. The electric starter 222 may be activated by operation of a user input on a control panel 18. To provide cooling and air flow for the engine-generator assembly 200, a generator cooling fan 224 may be attached to the rotor 208 of the generator 204. To ensure cooling of the engine 202, a cooling fan 226 may be attached to the lightweight flywheel 210 to provide air flow and cooling to the engine as the lightweight flywheel 210 rotates.

Alternatively, in some embodiments the functions listed above may be relocated in the same manner as the embodiment described in FIG. 5. For example, the spark plug firing and timing may be controlled by a Hall effect sensor and electronic ignition system. The battery charging function may be provided by the generator 204 or a charging device embedded in the generator 206. Further, the cooling fan may be an electric fan attached to the side or top of the engine.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    an engine;
    a generator coupled to the engine, wherein the generator comprises a rotor having a mass effective to absorb energy from the engine during firing portions and return energy to the engine during non-firing portions of a cycle of the engine, wherein the system excludes a flywheel, and the generator comprises a gear coupled to the rotor;
    a starter configured to rotate the gear to start the engine; and
    an electronic ignition system and a Hall effect sensor, wherein the electronic ignition system is configured to control engine ignition in response to feedback from the Hall effect sensor.

2. A method, comprising:
    removing a flywheel that substantially provides inertia to smooth power output of an engine of a welding system; and providing a connection between the engine and a rotor of a generator to both generate electricity and provide the inertia to smooth power output of the engine without the flywheel, wherein the rotor has a mass effective to substantially smooth power output of the engine by absorbing energy from the engine during firing portions and returning energy to the engine during non-firing portions of a cycle of the engine; and providing a control function to control the connection by disconnecting the rotor from the engine during startup and connecting the rotor with the engine after startup.

3. The system of claim 1, comprising a magnet coupled to an engine shaft, wherein the Hall effect sensor is configured to sense changes in magnetic field density associated with the magnet.

4. The system of claim 1, wherein the generator comprises a battery charging circuit, wherein the system is an engine-driven welding generator system having the engine, the generator, the starter, and the electronic ignition system.

5. The method of claim 2, comprising coupling a magnet to an engine shaft, wherein a Hall effect sensor senses changes in the magnetic field density associated with the magnet.

6. The system of claim 1, wherein the gear is coupled to a generator fan of the generator, and the generator fan is coupled to the rotor.

7. The system of claim 1, wherein the gear is disposed directly on the rotor or a rotor shaft of the generator.

8. The system of claim 1, wherein the starter is mounted to the generator.

9. The system of claim 1, wherein the system comprises a startup mode configured to startup the engine with the generator disconnected from the engine, and the system comprises an operation mode configured to connect the generator to the engine after the startup mode.

10. The method of claim 2, comprising relocating a starter to engage a gear coupled to a rotor of the generator.

11. The method of claim 10, comprising mounting the starter to the generator.

12. The method of claim 10, wherein the gear is coupled to a generator fan of the generator.

13. The method of claim 10, wherein the gear is disposed directly on the rotor or a rotor shaft of the generator.

14. The method of claim 2, comprising installing a replacement flywheel that provides insufficient inertia to smooth power output of the engine of the welding system, wherein the replacement flywheel has a size and/or weight at least 50 percent less than the flywheel.

15. The method of claim 2, wherein providing the control function comprises providing a startup mode to disconnect the rotor from the engine during startup to reduce a load on the engine during startup, and providing an operation mode to connect the rotor with the engine after startup to substantially smooth the power output of the engine.

* * * * *